United States Patent
Matsuguma et al.

(10) Patent No.: US 8,774,501 B2
(45) Date of Patent: Jul. 8, 2014

(54) IMAGE PROCESSING APPARATUS, IMAGE PROCESSING METHOD, IMAGE PROCESSING PROGRAM STORAGE MEDIUM

(75) Inventors: Chihiro Matsuguma, Kanagawa (JP);
Hiroyoshi Uejo, Kanagawa (JP);
Kazuhiro Ohya, Kanagawa (JP);
Katsuya Koyanagi, Kanagawa (JP);
Shintaro Adachi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 888 days.

(21) Appl. No.: 12/868,413

(22) Filed: Aug. 25, 2010

(65) Prior Publication Data
US 2011/0222762 A1 Sep. 15, 2011

(30) Foreign Application Priority Data
Mar. 9, 2010 (JP) ................................. 2010-052065

(51) Int. Cl.
*G06K 9/34* (2006.01)
(52) U.S. Cl.
USPC ......................................................... 382/164
(58) Field of Classification Search
USPC ......... 382/165, 260, 164, 178, 197, 203, 218, 382/258; 358/518, 474; 345/698; 702/104
See application file for complete search history.

(56) References Cited

U.S. PATENT DOCUMENTS

| 5,164,996 | A   | * | 11/1992 | Pastor | 382/203 |
| 6,304,826 | B1  | * | 10/2001 | Liu    | 702/104 |
| 7,903,872 | B2  |   | 3/2011  | Matsuzaki | |
| 2002/0080261 | A1 | * | 6/2002 | Kitamura et al. | 348/349 |
| 2002/0141648 | A1 |   | 10/2002 | Tanigawa | |
| 2004/0257622 | A1 |   | 12/2004 | Shibaki et al. | |
| 2006/0294452 | A1 |   | 12/2006 | Matsumoto | |
| 2007/0297668 | A1 |   | 12/2007 | Matsuzaki | |
| 2008/0122877 | A1 | * | 5/2008 | Aoyama | 345/698 |

FOREIGN PATENT DOCUMENTS

| CN | 1445984 A | 1/2003 |
| CN | 101094306 A | 12/2007 |
| JP | 2004-320448 A | 11/2004 |
| JP | 2007-006373 A | 1/2007 |
| JP | 2008-059122 A | 3/2008 |

OTHER PUBLICATIONS

Adobe ("Adobe Photoshop 7 Classroom in a Book", Published 2002, pp. 1-151).*
Japanese Office Action corresponding to Japanese Patent Application 2010-052065 issued on Nov. 19, 2014.
103 Examples of the Chinese Version of Photoshop CS2, Chapter 4, Example No. 7-10, Figs. 4-9-2, 4-9-3.
First Notification of Office Action corresponding to Chinese Patent Application 201010288545.9 dated Mar. 5, 2014.

* cited by examiner

*Primary Examiner* — Duy M Dang
(74) *Attorney, Agent, or Firm* — Sughrue Mion, PLLC

(57) ABSTRACT

An image processing apparatus includes a separation section, a background color setting section, and a generating section. The separation section separates at least one image component having different attributes contained in electronic document data expressing an original image. The background color setting section selects a coloring method, from among a plurality of coloring methods for coloring a background, according to software to be used and sets a background color. The generating section generates software data corresponding to the software by coloring the background color based on the setting of the background color setting section, and re-arranging the at least one image component.

8 Claims, 12 Drawing Sheets

FIG.3
ORIGINAL IMAGE
DERIVE HISTOGRAMS OF ALL PIXELS,
MAKE THE BACKGROUND COLOR
OF THE PAGE THE PEAK VALUES OF
THE HISTOGRAMS
Y : 214
Cb : 128
Cr : 151
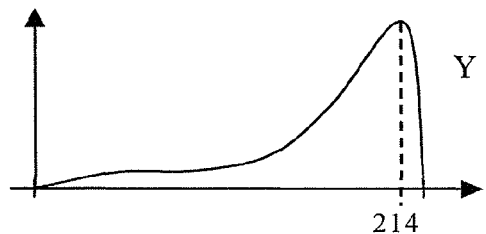
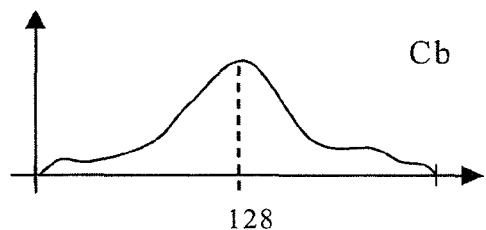
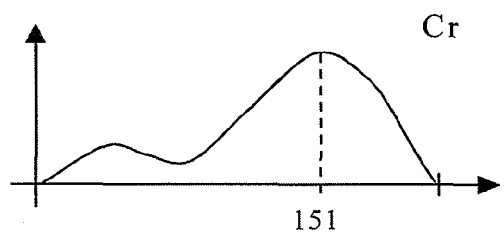

FIG.7

| SPECIFICATION OF SOFTWARE | SPECIFICATION OF BACKGROUND COLOR |
|---|---|
| WORD 2000 | APPLY BACKGROUND COLOR |
| WORD 2007 | BACKGROUND COLOR NOT APPLIED |
| WORD 2008 | APPLY BACKGROUND COLOR |

FIG.11A
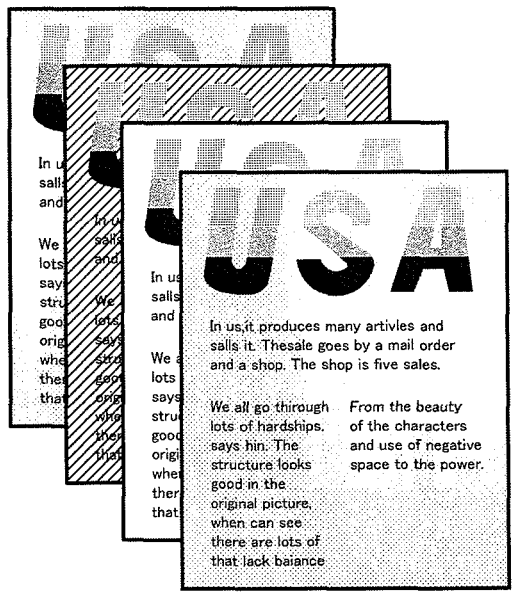
FIG.11B
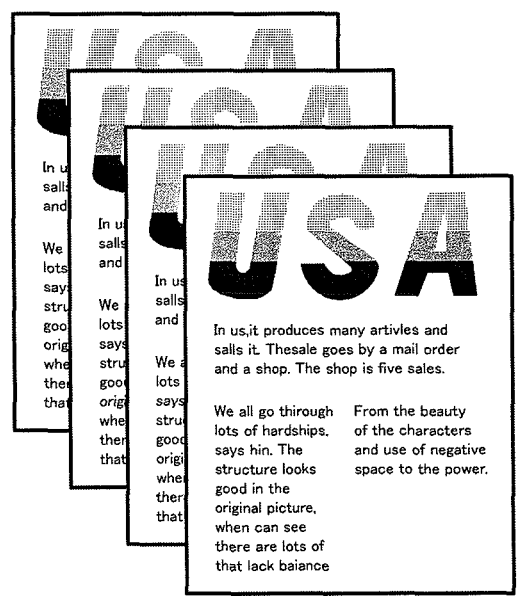
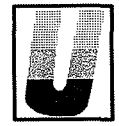
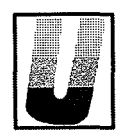

IMAGE PROCESSING APPARATUS, IMAGE PROCESSING METHOD, IMAGE PROCESSING PROGRAM STORAGE MEDIUM

CROSS-REFERENCE TO RELATED APPLICATIONS

This application is based on and claims priority under 35 USC 119 from Japanese Patent Application No. 2010-052065 filed on Mar. 9, 2010.

BACKGROUND

1. Technical Field

The present invention relates to an image processing apparatus, an image processing method and an image processing program storage medium.

2. Related Art

Technology is proposed which separate plural partial images (image components) from electronic document data digitalized by scanning an original image that contains plural image components with different attributes, such as photos, lines, text, tables and the like, and generate another electronic document data enabling the separated image component to be handled separately.

SUMMARY

An aspect of the present invention is an image processing apparatus including: a separation section that separates at least one image component having different attributes contained in electronic document data expressing an original image; a background color setting section that selects a coloring method, from among plural coloring methods for coloring a background, according to software to be used and sets a background color; and a generating section that generates software data corresponding to the software by coloring the background color based on the setting of the background color setting section, and re-arranging the at least one image component.

BRIEF DESCRIPTION OF THE DRAWINGS

Exemplary embodiments of the present invention will be described in detail based on the following figures, wherein:

FIG. 3 is a diagram for explaining a method of determining background color;

FIG. 7 is a table showing an example of specification of page background color coloring method;

FIGS. 10A to 10D are diagrams for explaining examples of coloring methods of background in cases of a single page, wherein FIG. 10A is a diagram showing an original image, FIG. 10B is a diagram showing a case where background color is not set, FIG. 10C is a diagram showing an example of coloring background color using software, and FIG. 10D is a diagram showing an example in which a background color image is inserted to an image file;

FIGS. 11A and 11B are diagrams for explaining examples of background coloring methods in cases of plural pages, wherein FIG. 11A is a diagram showing original images, and FIG. 11B is a diagram showing a case where background color is not set; and FIGS. 12A and 12B are diagrams for explaining examples of background coloring methods in cases of plural pages, wherein FIG. 12A is a diagram showing an example of coloring background colors by software, and FIG. 12B is a diagram showing an example where background color images are inserted to an image file.

DETAILED DESCRIPTION

Figure 1:
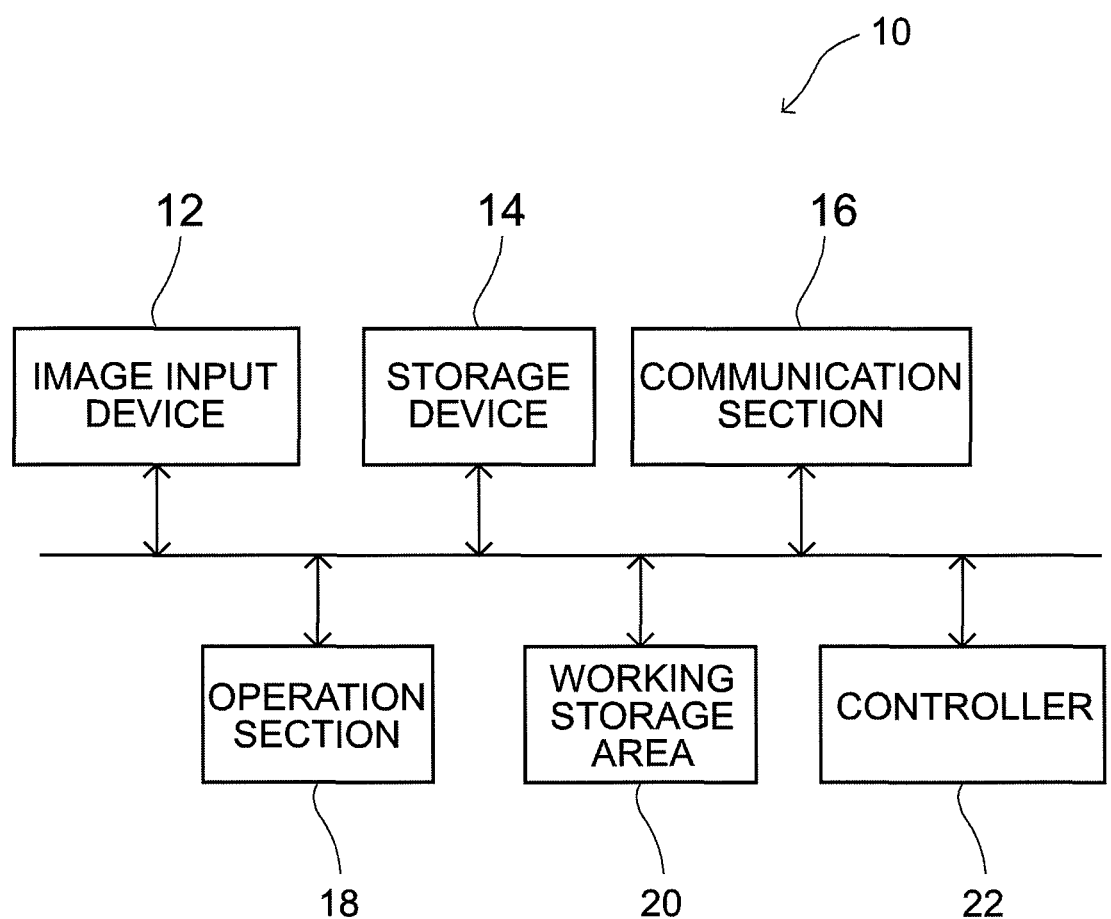
FIG. 1 is a diagram showing a schematic configuration of an image processing apparatus according to an exemplary embodiment of the present invention.

An image processing apparatus 10 according to a present exemplary embodiment, as shown in FIG. 1, includes an image input device 12, a storage device 14, a communication section 16, an operation section 18, a working storage area 20 and a controller 22, respectively connected together, with the overall apparatus controlled by the controller 22.

The image input device 12 inputs electronic document data expressing an original image. For example, the image input device 12 may be configured with an image scanning device that scans an original image and converts the original image into electronic document data, or configured with a storage medium on which electronic document data is stored.

The storage device 14 stores electronic document data input by the image input device 12 and is also stores, for example, a program for separating plural partial images (image components) with different attributes contained in the electronic document data (image components with different attributes such as text, graphics such as computer graphics (CG), lines, photos, tables and the like) and generating another electronic document data of a format enabling reuse of the image components. Such a program is executed by the controller 22.

The communication section 16 is connected to a communication section such as a network, and communication is performed with external data processing devices (such as a personal computer, an image forming device and the like), and data received via the communication section 16.

The operation section 18 includes operation buttons and a display device, and various settings are made to the image processing apparatus 10 and execution of the above described program is instructed by operation of the operation buttons according to information displayed on the display device.

The working storage area 20 functions as a working storage area when the above described program is being executed, and/or functions as a working storage area when the controller 22 performs various control operations of the image processing apparatus 10.

Figure 2:
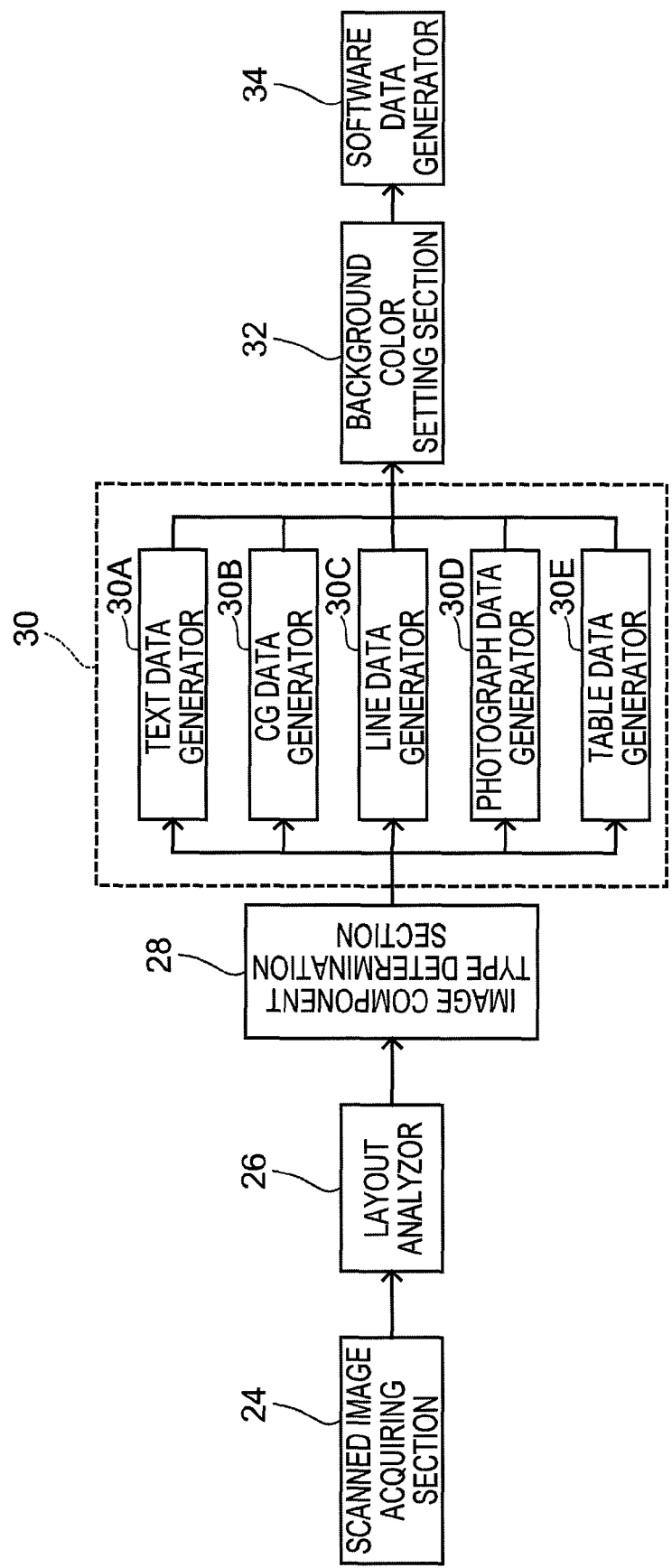
FIG. 2 is a block diagram showing a functional configuration of the image processing apparatus according to the exemplary embodiment.

FIG. 2 is a block diagram showing a functional configuration of the image processing apparatus 10 according to the present exemplary embodiment.

The controller 22 of the image processing apparatus 10 functions as: a scanned image acquiring section (acquiring section) 24; a layout analyzing section (analyzing section) 26; an image component type determination section (determination section) 28; various data generators 30 that perform data generation for each type of image component (a text data generator 30A, a graphic (CG) data generator 30B, a line data generator 30C, a photograph data generator 30D, a table data generator 30E); a background color setting section (setting section) 32, and a software data generator 34.

The scanned image acquiring section (acquiring section) 24 acquires electronic document data input by, for example the image input device 12, and/or acquires the electronic document data stored, for example, on a storage medium.

The layout analyzer (analyzer) 26 analyzes the electronic document data acquired by the acquiring section 24, and determines regions of image components by extracting regions of text, graphics (CG), lines, photographs and the like. The analyzer 26 employs known techniques capable of determining image component regions. For example, the image component regions can be determined by processing of binarization and labeling the electronic document data or connecting images that have been labeling processed.

The image component type determination section (determination section) 28 determines the type of the image components, based on various characteristic amounts, such as the density distribution of the image components, and then separates the image components. The type of the image component can also be determined in the determination section 28 using a known technique. As the type of image component for determination there are, for example, text, graphics (CG), lines, photographs, tables, and the like.

The various data generators 30 (the text data generator 30A, the graphic (CG) data generator 30B, the line data generator 30C, the photograph data generator 30D, the table data generator 30E) generate data according to the determined type of each of the image components.

The background color setting section (setting section) 32 selects a coloring method of background color from among plural coloring methods of background color, according to software to be employed, and sets the background color. Specifically, the setting section 32 selects the coloring method of background color according to the contents set by operation of the operation section 18 (for example, a coloring method adopted in each software), and sets the background color. As the coloring method of background color, for example, when generating document data for software in which background color can be set, the background color is colored by background color setting of the software, and when generating document data for software in which background color cannot be set, coloring of the background color is performed by generating a background color image having the same size as the page and colored in the background color, and inserting in the document data the background color image at the background side, thereby coloring the background. When background color is not to be applied, a background color is not applied, and off pixels of the separated image components (ineffective pixel regions) are filled with white. For the separated image components, background color can be reproduces by filling the off pixels with background color. As a method of determining the background color, for example, as shown in FIG. 3, histograms may be derived for all of the pixels in the page, and the peak values of the histograms may be determined as the background color of the page.

The software data generator 34 re-arranges the data generated in the various data generators 30, and also, according to the background color set by the setting section 32, generates software data that corresponds to the software specified by the operation section 18.

Figure 4:
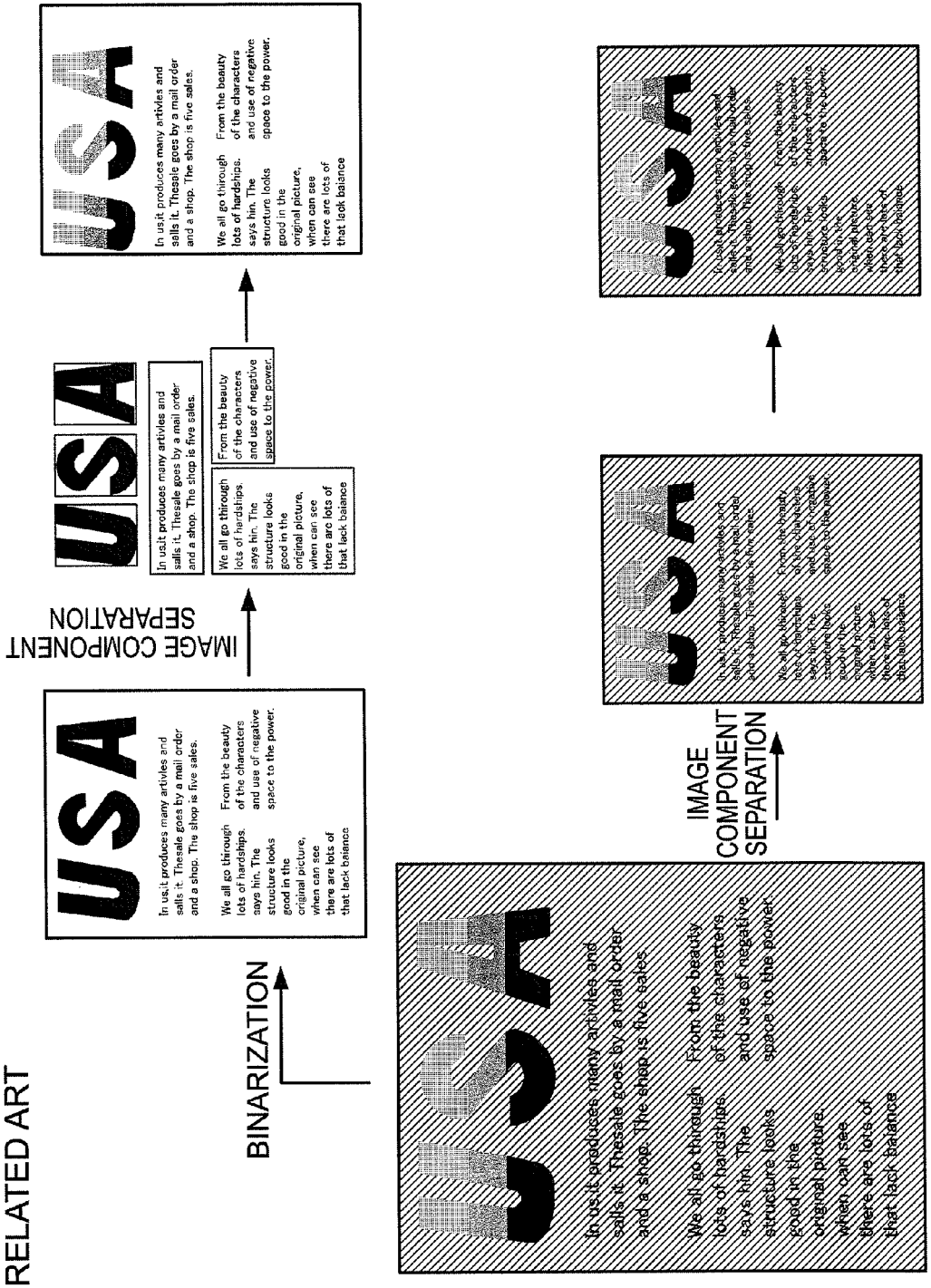
FIG. 4 is a diagram for explaining a related coloring method of background color.

In related technology, as shown in FIG. 4, electronic document data expressing an original image is binarized, image components are separated, and are re-arranged. However, in this method, the image components have a different background color to that of the original image. Or, since the background color is reproduced by extracting the entire page as an image component, each of the image components can no longer be treated separately, and reusability is lost.

Figure 5:
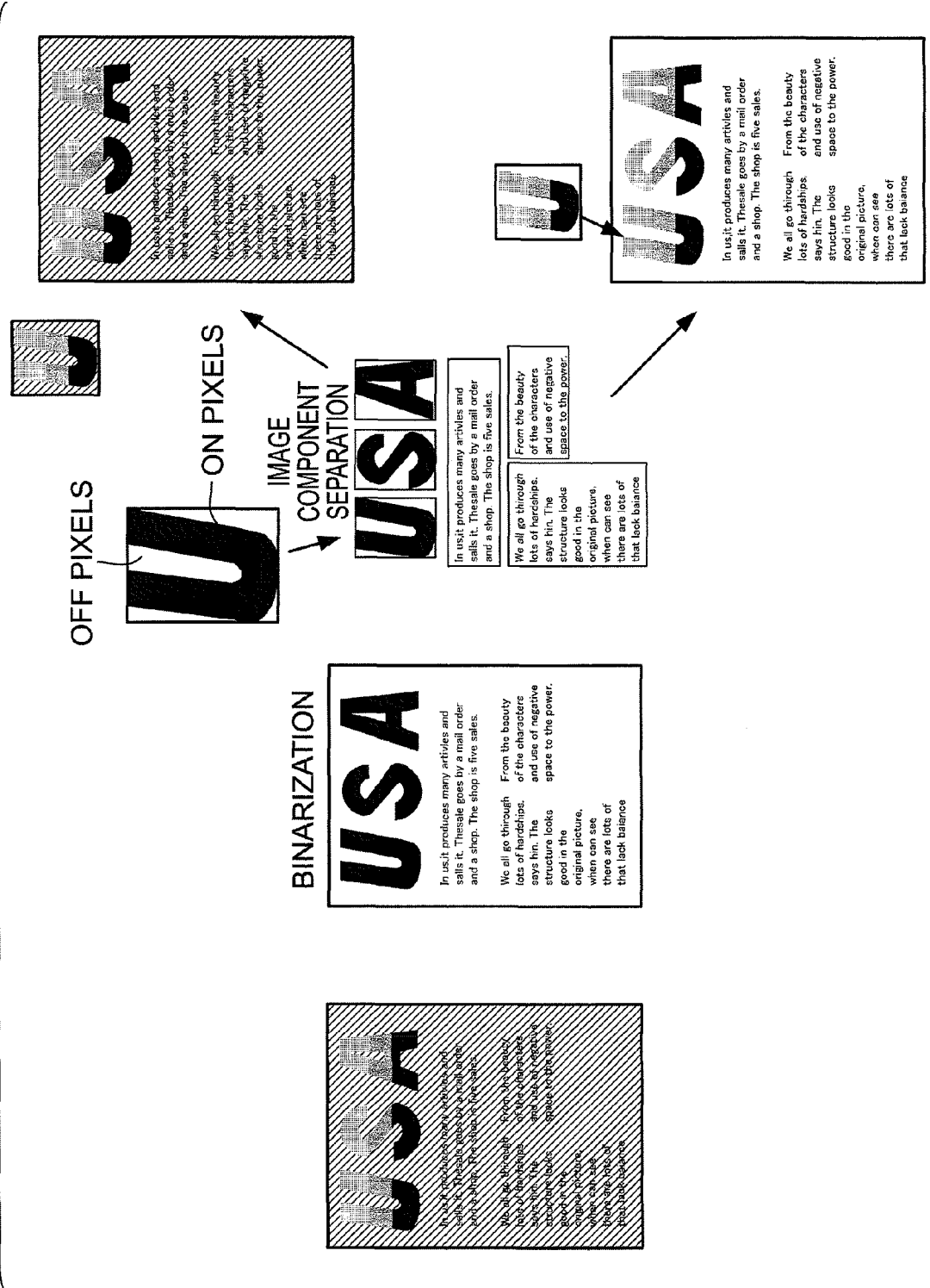
FIG. 5 is a diagram for explaining a background color coloring method in the image processing apparatus according to the exemplary embodiment.

In contrast thereto, in the image processing apparatus 10 according to the present exemplary embodiment, as shown in FIG. 5 for example, electronic document data expressing an original image is binarized, and image components are separated from the original image by labeling processing or connecting images which have been labeling processed. In software that can set a background color, the background color setting is performed by the software, and for the separated image component, the off pixels are filled with the background color and re-arranged, thereby generating software data. Accordingly, the background color of the original image is reproduced, and since the image components are separated, reusability of the image components is preserved. In cases in which the background color is not set, since software data is generated by filling the off pixels of the separated image components with white and re-arranging the image components, the background color is different from that of the original image. However, the generated image may be natural, and since the image components are separated, reusability thereof is preserved.

In the image processing apparatus 10 according to the present exemplary embodiment, when a software is used (selected) in which a background color cannot be set or different background colors cannot be set to plural pages, setting of the background color is not carried out by only using software, but carried out by generating a background color image colored with the background color and inserting the background color image to the resultant software data. Namely, according to the software employed, selection is made from plural coloring methods for coloring the background color and the background color is set thereby. Accordingly, when generating software data for software that can set a background color, the background color is set using the software, and when generating software data for software that cannot set a background color, the background color is set by inserting therein a background color image colored with the background color. Since in both cases software data can be generated by re-arranging the separated image components, reusability of the separated image components is preserved, and the background color of the original image can be reproduced.

Figure 6:
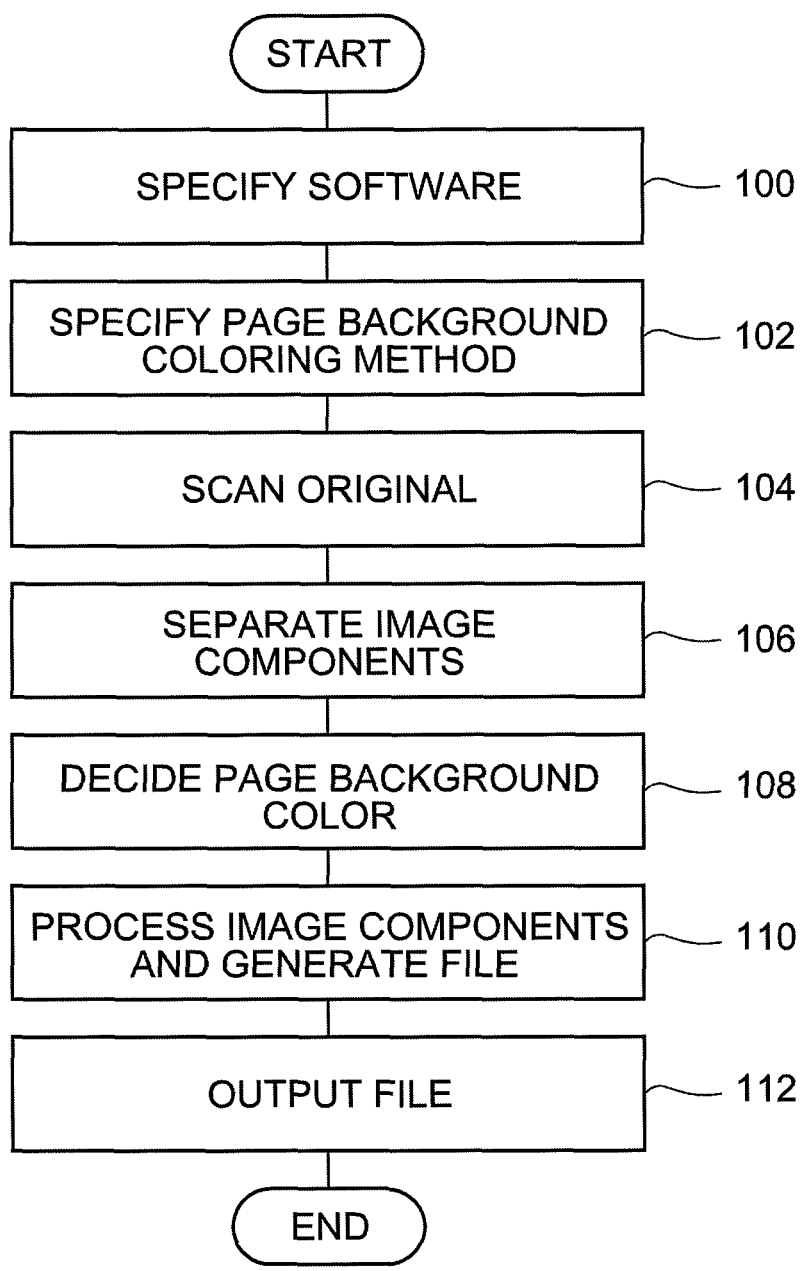
FIG. 6 is a flow chart showing an example of flow of processing performed in the image forming apparatus according to the exemplary embodiment.

Next, processing performed by the image processing apparatus 10 according to the present exemplary embodiment configured as described above will be described. FIG. 6 is a flow chart showing an example of the flow of processing performed in the image processing apparatus 10 according to the present exemplary embodiment. Processing flow is shown for a case in which a program stored in the storage device 14 is executed by the controller 22.

First, at step 100, the software used for the electronic document data input by the image input device 12 is specified, and then the processing proceeds to step 102. The specification of the software may be performed by setting in advance the software to be employed using the operation section 18 and reading out setting data indicating the specified software, or may be performed by requesting each time when the processing is performed an operation of the operation section 18 so as to specify the software.

At step 102, specification of the page background color coloring method is performed, and then processing proceeds to step 104. The specification of the page background coloring method may also be set in advance for each software using the operation section 18 and read out setting data indicating the specified page background coloring method, or may be specified each time when the processing is performed. In the case in which the page background coloring method is set in advance, for example, application of background color may be set for each of the software as shown in FIG. 7. FIG. 7 shows an example in which Microsoft Corporation word processing software "Word" is used as the software.

At step 104, an original is scanned by, for example, an image scanning device, the electronic document obtained by scanning is input by the image input device 12, and then the processing proceeds to step 106. Namely, the acquiring section 24 acquires electronic document data expressing an original image.

At step 106, image component separation is performed, and then the processing proceeds to step 108. In the image component separation, regions of text, graphics (CG), lines, photographs, tables and the like are extracted by analyzing the electronic document data using the analyzer 26, and regions of the image components (image component regions) are determined. Then, the type of the separated image components is determined by the determination section 28, and data is generated according to the type of each of the image components using the various data generators 30 (the text data generator 30A, the graphic (CG) data generator 30B, the line data generator 30C, the photograph data generator 30D, the table data generator 30E).

At step 108, a page background color is determined and then the processing proceeds to step 110. The decision of the background color is performed, for example, as shown in FIG. 3, by deriving histograms of all of the pixels of the original image, and using the peak values of the histograms as the background color of the page. In the example shown in FIG. 3, the background color (Y, Cb, Cr)=(214, 128, 151).

In step 110, the image components are processed, a file thereof is generated, and the processing proceeds to step 112. In the processing of the image components, the separated image components are attached with attributes according to their type are re-arranged on an under color of the determined background color, thereby generating a file (software data). At this time, in a case in which software data for software in which the background color cannot be set is generated, the background color of the original image is reproduced by generating software data by inserting therein a background color image of page size having the background color.

At step 112, the generated file (software data) is output, thereby completing one sequence of the processing.

Figure 8:
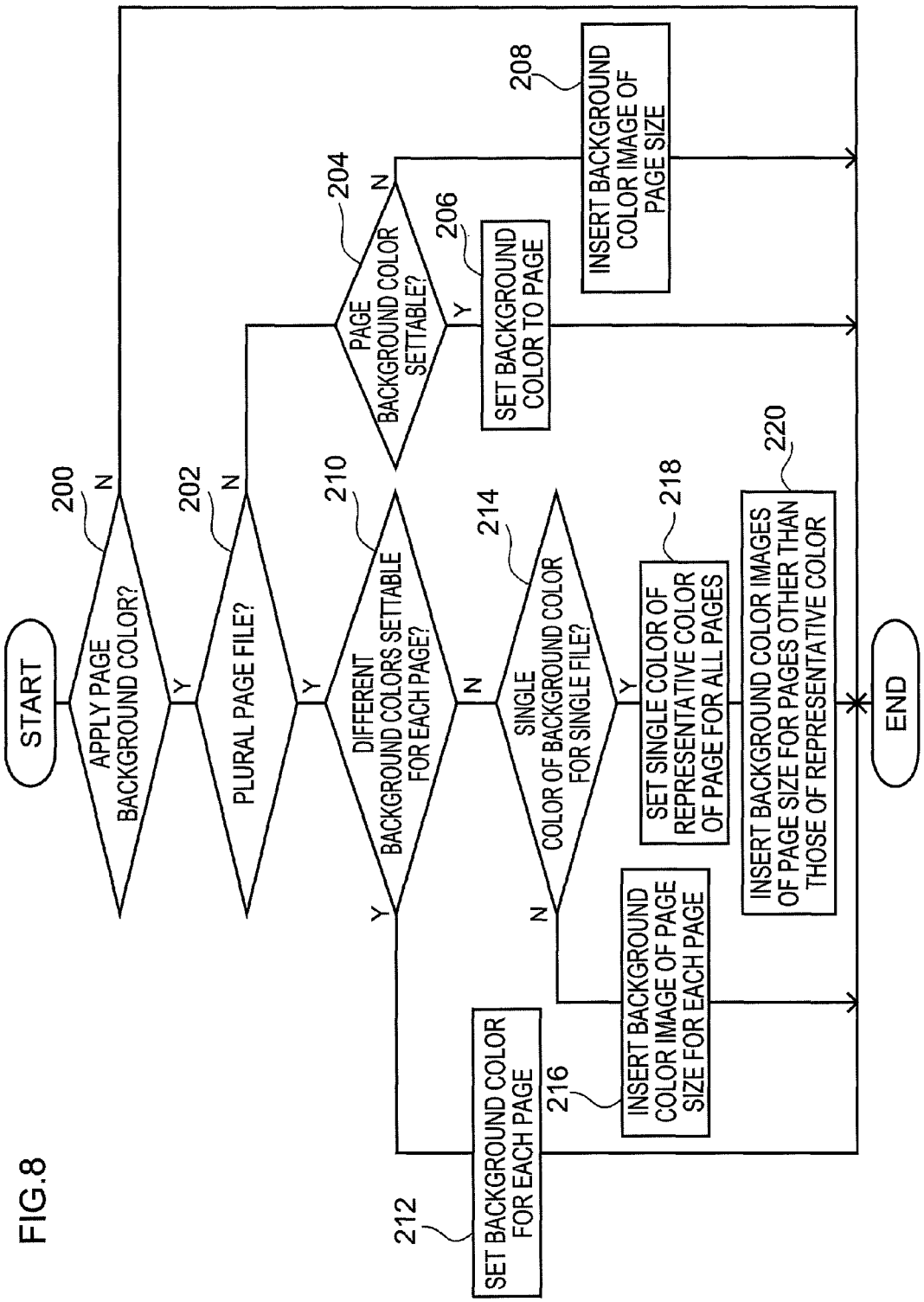
FIG. 8 is a flow chart showing an example of flow of processing performed in a background color setting section.

Next, explanation will be given regarding setting of the background color performed by the setting section 32 during processing of the image components at above step 110. FIG. 8 is a flow chart showing an example of a flow of processing performed by the setting section 32.

At step 200, determination is made as to whether or not to apply a page background color. This determination is performed according to an operation of the operation section 18 by a user. When a negative determination is made, the processing is ended at this point, and the image component processing is performed without applying a background color. When an affirmative determination is made, the processing proceeds to step 202.

At step 202, determination is made as to whether or not the file is for plural pages. In this determination, it is determined whether or not the file of electronic document data acquired by the acquiring section 24 contains plural pages. When a negative determination is made, processing proceeds to step 204. When an affirmative determination is made, the processing proceeds to step 210.

At step 204, determination is made as to whether or not a page background color can be set. This determination is based on the specification of the software at step 100, and the specification of the page background color coloring method at step 102. That is, a determination is made as to whether or not the page background color can be set with the software specified at step 100. When an affirmative determination is made, the processing proceeds to step 206, and when a negative determination is made, the processing proceeds to step 208.

At step 206, the background color is set for the page, thereby completing one sequence of the processing. Namely, when the software which can set a background color is selected, background color setting is performed in the software.

In step 208, a background color image of the page size having the background color is inserted to a resultant file, and one sequence of the processing is complete. Namely, when the software in which background color cannot be set is selected, background color is reproduced by inserting into the file (software data) a background color image of the page size having the background color determined at step 108, and re-arranging and superimposing the separated image components on this background color image.

However, when the file includes plural pages, the processing proceeds to step 210, and a determination is made as to whether or not different background colors can be set for each page. This determination determines whether or not the software specified at step 100 can set different background colors for each of the pages. When an affirmative determination is made, the processing proceeds to step 212. When a negative determination is made, the processing proceeds to step 214.

At step 212, the background color is set for each of the pages, and one sequence of the processing is complete. Namely, when the background color can be set for each page in the selected software, background color setting is performed in the software.

At step 214, determination is made as to whether or not a single color of background color can be set for a single file. This determination determines whether or not in the software specified at step 100, a single color background color can be set for each single file. When a negative determination is made, the processing proceeds to step 216. When an affirmative determination is made, the processing proceeds to step 218.

At step 216, the background color is reproduced by inserting into the file for each page a background color image of the page size having the background color determined at step 108, and re-arranging and superimposing the separated image components on the background color images.

At step 218, one color that is a representative color of the pages is set for all of the pages, and the processing proceeds to step 220. The representative color may be determined by, for example, selecting the background color of the first page as the representative color, selecting the background color that is most common out of all of the pages as the representative color, or selecting the faintest color density or darkest color density as the representative color. The background color that results in the least volume of data when the background color image is inserted in the file may also be employed as the representative color.

At step 220, the background color is reproduced by inserting into the file for each of the pages a background color image of the page size having the background color determined at step 108, re-arranging and superimposing the separated image components on the background color images, and one sequence of the processing is completed.

Figure 9:
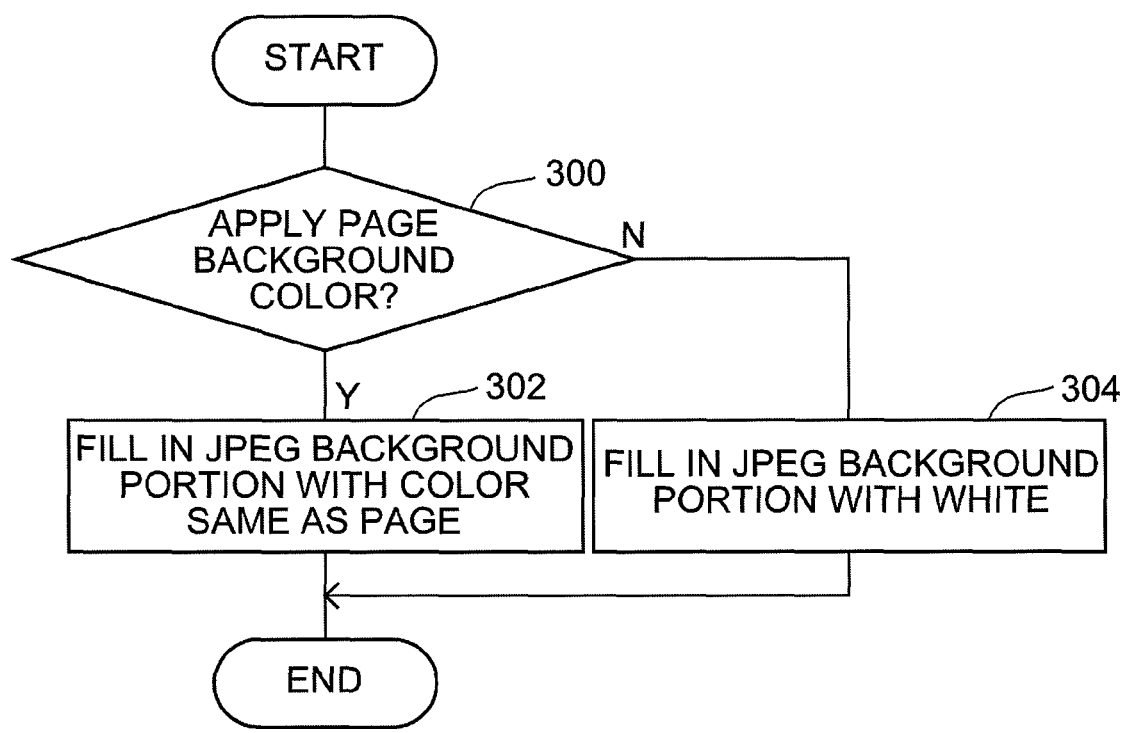
FIG. 9 is a flow chart showing an example of flow of processing related to setting the background color of a JPEG as a separated partial image (image component)

Next, explanation will be given regarding setting of background colors to the separated image components. FIG. 9 is a flow chart showing an example of flow of processing relating to setting of a background color to a separated image component of JPEG format.

At step 300, a determination is made as to whether or not to apply a page background color. This determination is determined based on the specification of a page background coloring method in step 102. When an affirmative determination is made, the processing proceeds to step 302. When a negative determination is made, the processing proceeds to 304.

At step 302, the background color of the image component is set by filling the background portion of the JPEG image (data of the image component) with the same color as the page, and the processing is ended.

At step 304, the background portion of the JPEG image is filled with white, and one sequence of the processing is completed.

Next, an explanation will be given regarding a specific example of setting of a background color by the setting section 32.

Figure 10A:

For example, explanation will be given regarding a case in which electronic document data of a single page having background color as shown in FIG. 10A has been input.

Figure 10B:
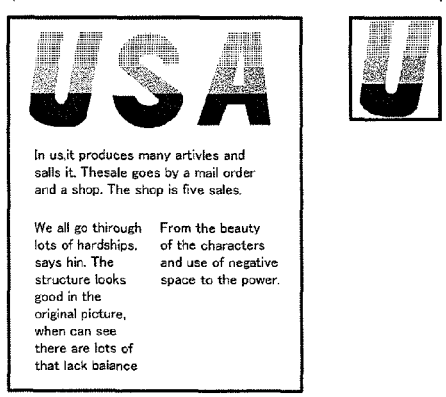

When a negative determination is made at step 200 and background color is not to be applied, software data is generated by re-arranging the separated image components and filling the off pixels of the separated image components with white, as shown in FIG. 10B. Accordingly, although the generated software data has a different background color to that of the original image, a natural image can be re-produced.

Figure 10C:
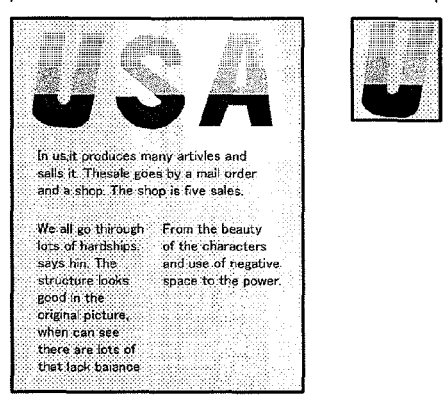

When background color is to be applied with software in which background color can be set (step 206), as shown in FIG. 10C, software data is generated by setting a background color in the software, re-arranging the separated image components, and filling the off pixels of the separated image components with the background color. The background color of the original image can be thus reproduced. Further, since the separated image components are separated and re-arranged, reusability of the image components is preserved.

Figure 10D:
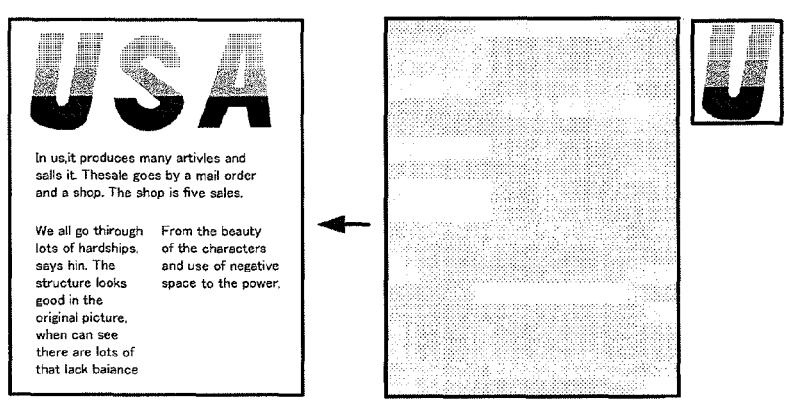

When the background color is applied by using a software in which background color cannot be set (step 208), as shown in FIG. 10D, software data is generated by inserting therein a background color image of the page size having the background color, superimposing the separated image components on the background color image, and filling the off pixels of the separated image components with the background color. Namely, even in cases where software data is generated in software in which a background color cannot be set, the background color of the original image can be reproduced since a background color image having the background color is pasted to the image data. Further, since the image components are separated and re-arranged, reusability of the image components is preserved.

Next, explanation will be given regarding a case, as shown in FIG. 11A, where the electronic document data has different background colors for each of the pages.

In a case in which the original image includes plural pages, when a negative determination is made at step 200 and the background color is not applied, as shown in FIG. 11B, software data is generated by re-arranging the separated image components for each of the pages, and filling the off pixels of the separated image components with white. Accordingly, although the generated software data has a different background color for each page than the original image, a natural image can be re-produced.

Figure 12A:
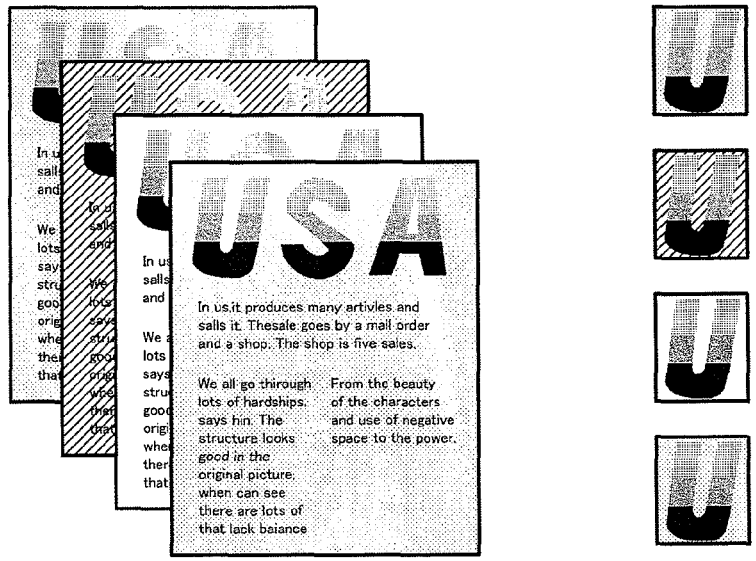

When background color is applied with software in which a different background color can be set for each page (step 212), as shown in FIG. 12A, software data is generated by setting the background color for each of the pages by the software, re-arranging the separated image components, and filling the off pixels of the separated image components with the background color of the respective page. Accordingly, the background color of the original image is reproduced. Further, since the separated image component are separated and re-arranged, reusability of the image components is preserved.

When a background color is applied with software in which setting of a background color is not possible (step 216), in a similar manner to a case of single page, software data is generated by inserting therein a background color image of the page size having the background color for each page, re-arranging and superimposing the separated image components on the background color image, and filling the off pixels of the separated image components with the background color. Namely, even when software data is generated by software in which the background color cannot be set, the background color of the original image is reproduced by pasting the background color image to the image data (file). Further, since the separated image component are separated and re-arranged, reusability of the image components is preserved.

Figure 12B:
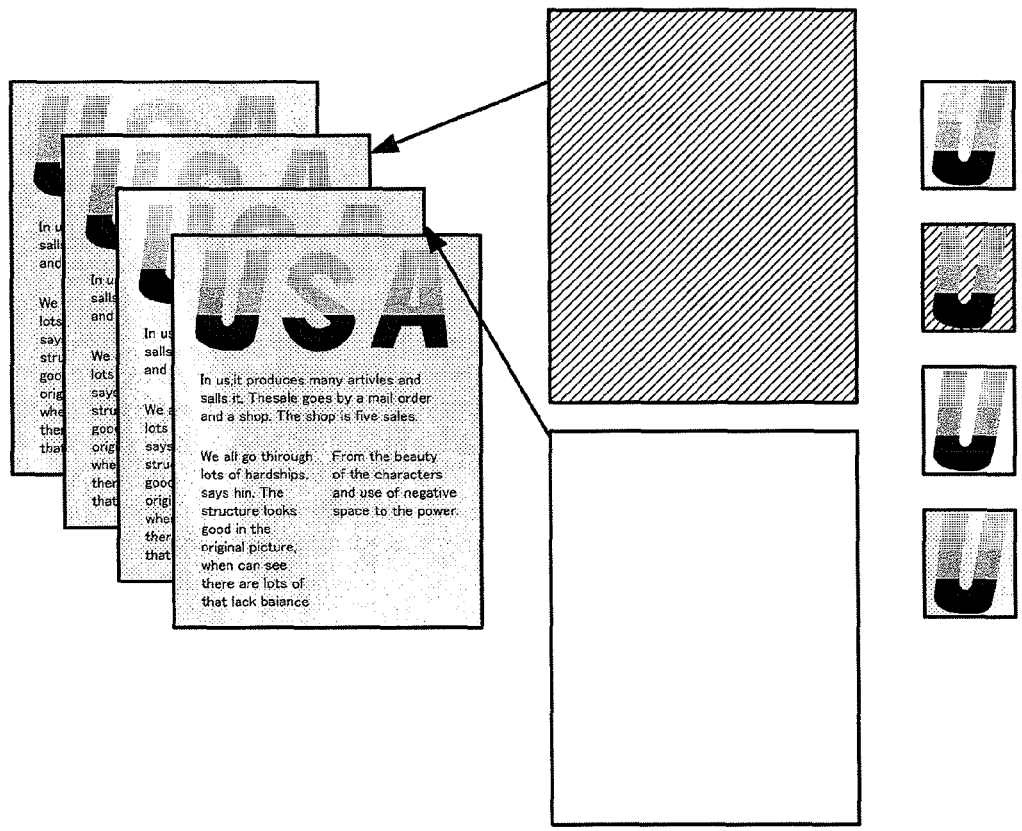

When only a single color can be set for the background color per single file (step 220), as shown in FIG. 12B, software data is generated by determining a representative color, applying a background color of the representative color by the software, for other background colors, inserting therein a background color image of the page size having the background color, and re-arranging the respective separated image components. Accordingly, the background color for each pages of the original image is reproduced. Further, since the image components for each page are separated and re-arranged, reusability of the image components is preserved. By applying as the representative color the background color of the greatest number of pages, for example, the number of background color images of the page size to be inserted in the software data can be decreased, and an increase in the amount of data can be suppressed. The example of FIG. 12B shows an example in which the background color used in the greatest number of pages (the background color of the first page and the fourth page) is selected as the representative color.

In the exemplary embodiment described above, explanation has been given with respect to an image processing apparatus. However embodiment may be applied, for example, to an image forming apparatus equipped with an image scanning device for scanning original images.

Further, although each of the processing of the exemplary embodiment has been described as beings performed by execution of a program, embodiments are not limited thereto, and the processing may be realized by using a hardware configuration.

What is claimed is:
1. An image processing apparatus comprising:
 a separation section configured to separate at least one image component from electronic document data expressing an original image;

a background color setting section configured to select a coloring method, from among a plurality of coloring methods for coloring a background, according to software to be used, and to determine whether a background color is able to be set; and a generating section, as executed by a processor, configured to generate software data corresponding to the software by coloring the background color based on the determination of whether the background color is able to be set, and to arrange the at least one image component, wherein, in response to determining that the background color is able to be set, the background color setting section selects a first coloring method in which the background color is colored by the software, and wherein, in response to determining that the background color is unable to be set, the background color setting section selects a second coloring method in which the background color is colored by inserting a background color image colored with the background color into the software data.

2. An image processing apparatus comprising:
a separation section configured to separate at least one image component from electronic document data expressing an original image;
a background color setting section configured to:
  select a coloring method, from among a plurality of coloring methods for coloring a background, according to software to be used, a number of pages of the electronic document data, and the coloring methods that are selectable in the software; and
  determine whether a background color is able to be set; and
a generating section, as executed by a processor, configured to generate software data corresponding to the software by coloring the background color based on the determination of whether the background color is able to be set, and to arrange the at least one image component.

3. The image processing apparatus of claim 1, further comprising a selection section that selects whether or not a background color is to be colored when the software data is being generated by the generating section.

4. The image processing apparatus of claim 1, wherein the generating section generates the software data by coloring an ineffective pixel region of the at least one image component with the background color and re-arranging the at least one image component.

5. An image processing apparatus comprising:
a separation section configured to separate at least one image component from electronic document data expressing an original image;
a background color setting section configured to select a coloring method, from among a plurality of coloring methods for coloring a background, according to software to be used, and to determine whether a background color is able to be set; and
a generating section, as executed by a processor, configured to generate software data corresponding to the software by coloring the background color based on the determination of whether the background color is able to be set, and to arrange the at least one image component,
wherein the background color setting section selects either a first coloring method in which the background color is colored by the software or a second coloring method in which the background color is colored by inserting a background color image colored with the background color into the software data, and
wherein in response to the electronic document data including a plurality of pages, the background color setting section selects the coloring method based on a number of pages of each background color such that a data amount of the software data is reduced.

6. An image processing apparatus comprising:
a separation section configured to separate at least one image component from electronic document data expressing an original image;
a background color setting section configured to select a coloring method, from among a plurality of coloring methods for coloring a background, according to software to be used, and to determine whether a background color is able to be set; and
a generating section, as executed by a processor, configured to generate software data corresponding to the software by coloring the background color based on the determination of whether the background color is able to be set, and to arrange the at least one image component,
wherein the background color setting section selects either a first coloring method in which the background color is colored by the software or a second coloring method in which the background color is colored by inserting a background color image colored with the background color into the software data, and
wherein in response to the electronic document data including a plurality of pages having different background colors and determining that only a single background color is able to be set, the background color setting section determines a representative background color from the different background colors based on a frequency of appearance of the background colors or density of the background colors, selects the first coloring method for a page having the determined representative background color, and selects the second coloring method for a page having a background color other than the determined representative background color.

7. An image processing method comprising:
separating at least one image component from electronic document data expressing an original image;
selecting a coloring method, from among a plurality of coloring methods for coloring a background, according to software to be used and determining whether a background color is able to be set; and
generating, using a processor, software data corresponding to the software by coloring the background color based on the determination of whether the background color is able to be set, and arranging the at least one image component,
wherein, in response to determining that the background color is able to be set, the selected coloring method is a first coloring method in which the background color is colored by the software, and
wherein, in response to determining that the background color is unable to be set, selected coloring method is a second coloring method in which the background color is colored by inserting a background color image colored with the background color into the software data.

8. A non-transitory computer-readable storage medium storing a program for causing a computer to execute image processing, the image processing comprising:
separating at least one image component from electronic document data expressing an original image;
selecting a coloring method, from among a plurality of coloring methods for coloring a background, according to software to be used and determining whether a background color is able to be set; and generating software data corresponding to the software by coloring the background color based on the determination of whether the background color is able to be set, and arranging the at least one image component, wherein, in response to determining that the background color is able to be set, the selected coloring method is a first coloring method in which the background color is colored by the software, and wherein, in response to determining that the background color is unable to be set, selected coloring method is a second coloring method in which the background color is colored by inserting a background color image colored with the background color into the software data.

* * * * *